Aug. 18, 1942.                D. A. JOHNSTON                    2,293,260
                              AUTOMATIC CUT-OFF
                             Filed July 5, 1939              4 Sheets-Sheet 3
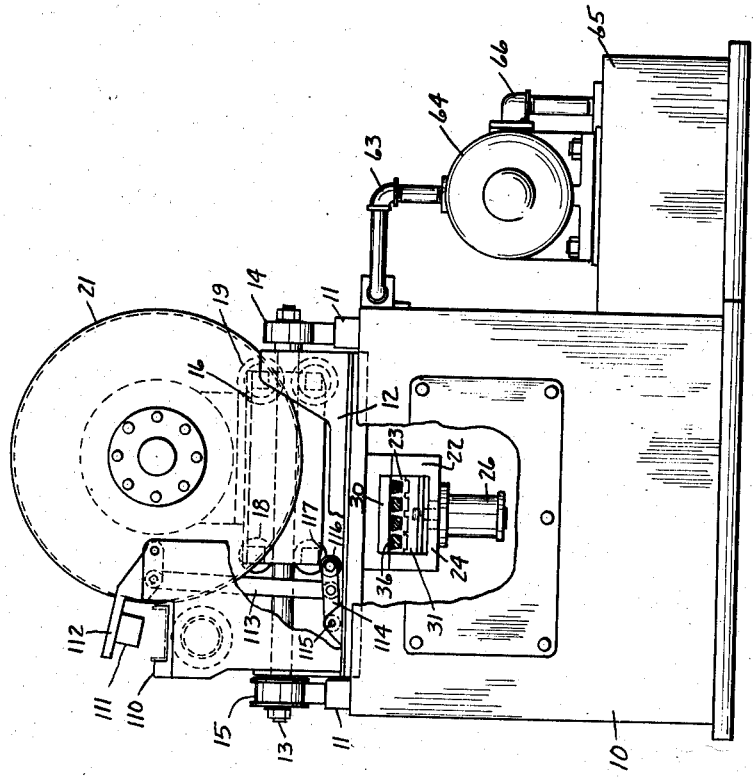
Inventor
DWIGHT A. JOHNSTON
By Francis J. Kleinpaff
                                Attorney

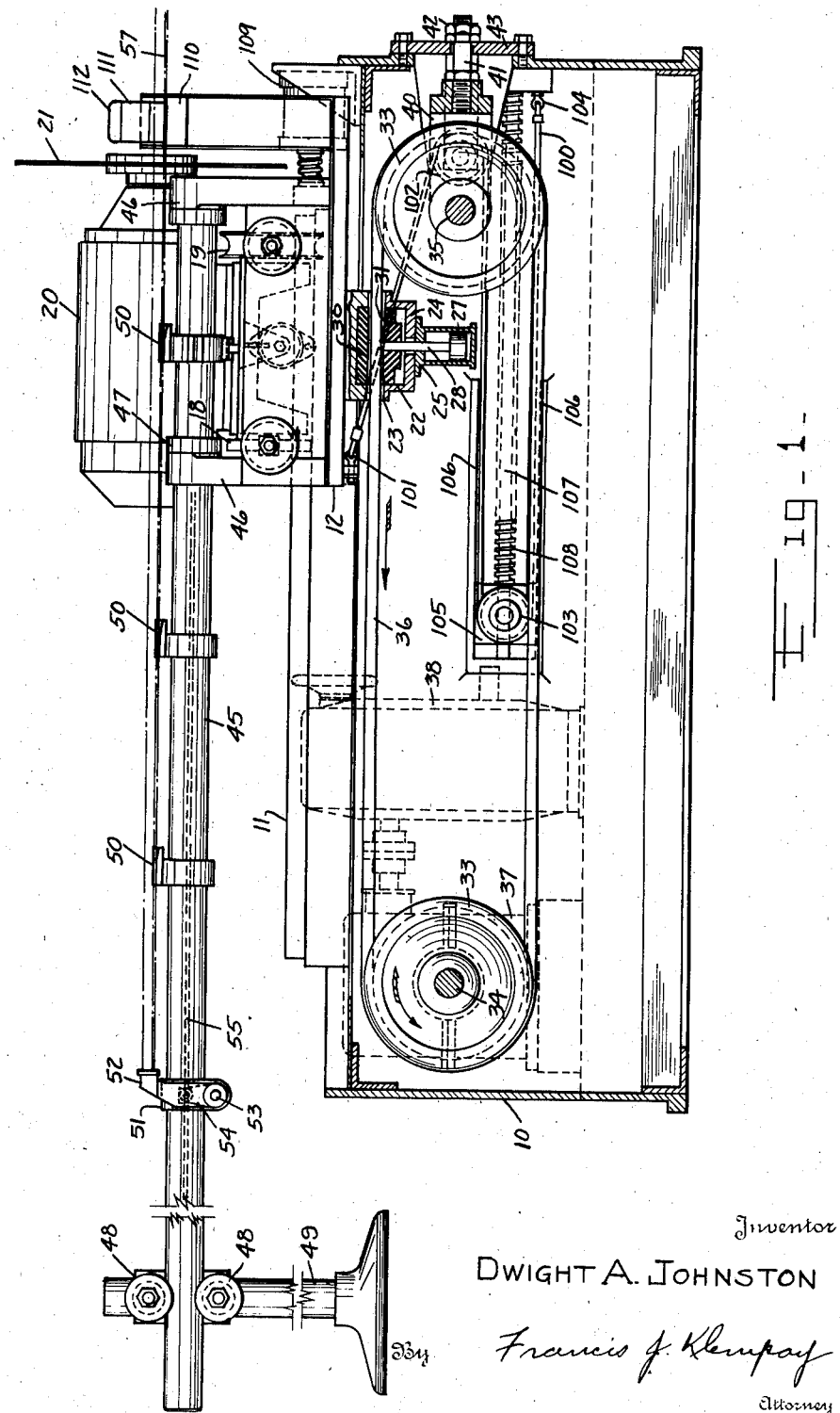

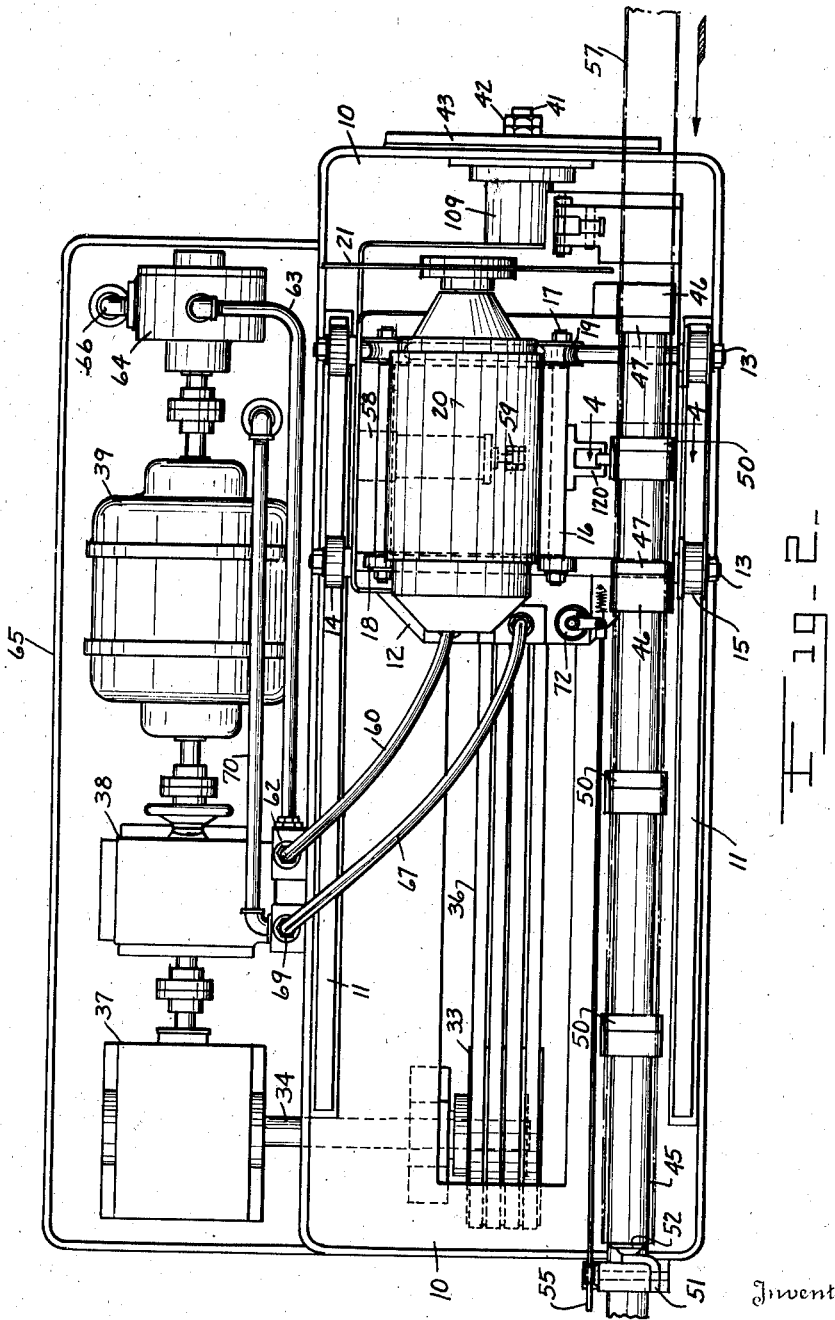

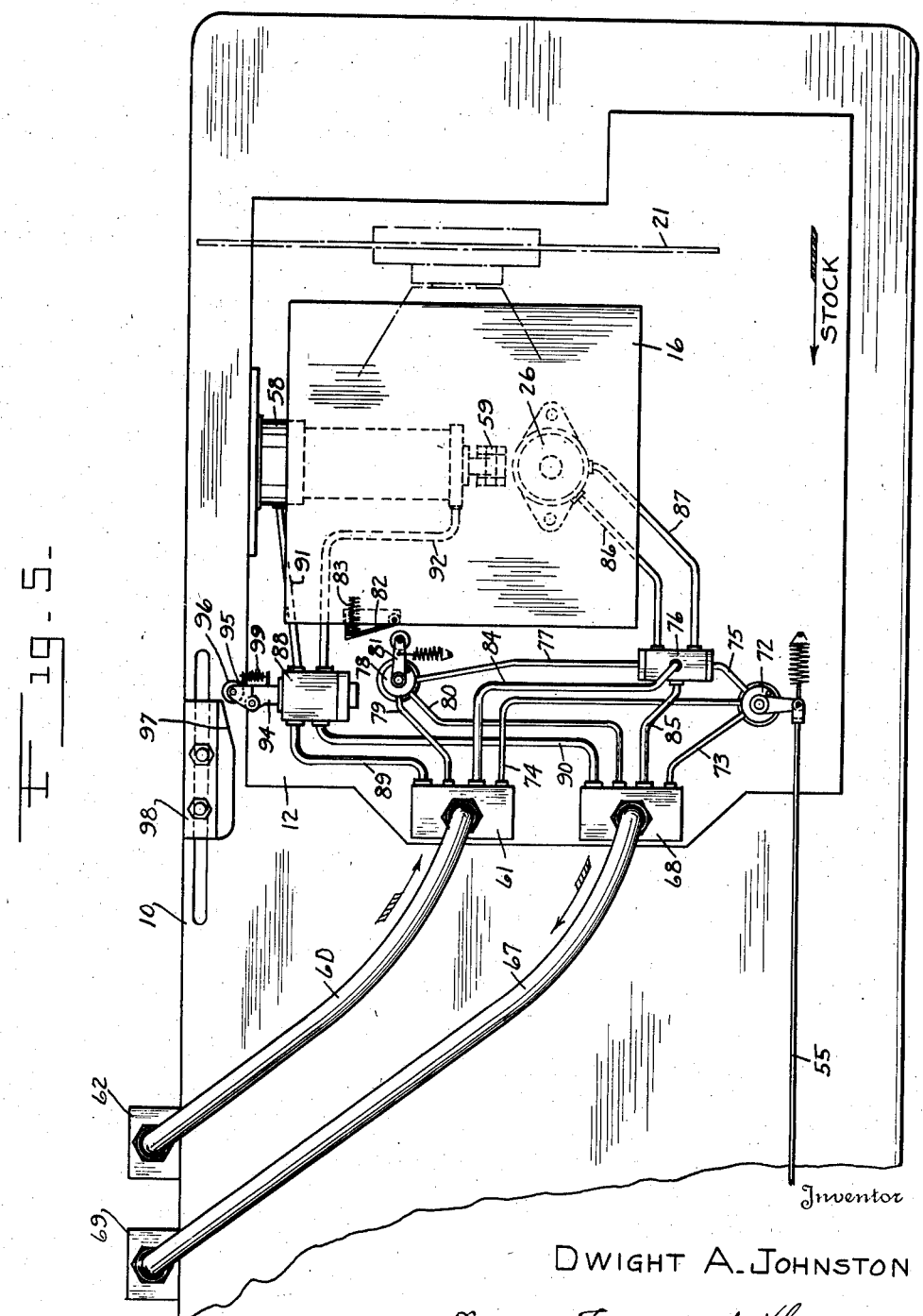

UNITED STATES PATENT OFFICE 2,293,260

AUTOMATIC CUTOFF

Dwight A. Johnston, Youngstown, Ohio, assignor to McKay Machine Company, Youngstown, Ohio, a corporation of Ohio Application July 5, 1939, Serial No. 282,885

10 Claims. (Cl. 29—69)

This invention relates to an automatic machine for severing accurate predetermined lengths from continuously endwise moving continuous stock, such as tubes or other form sections, as they issue from a forming or a forming and welding apparatus. The machine, commonly termed a cut-off, is necessarily provided with a cutting implement, such as a saw or a shearing die set, which is arranged to move along with the stock for a portion of its path of travel and to perform the severing operation during such movement. The severing implement including its driving mechanism and immediate supports is ordinarily of considerable weight and the oscillation of this assembly parallel with the path of travel of the stock being acted on has heretofore presented serious difficulties, particularly in machines adjusted to sever lengths from relatively fast moving stock.

A cycle of movement of the cutting implement assembly which consists of an outward movement along with the stock and an inward movement in a direction opposite to the direction of movement of the stock back to its original starting position must, of course, be accomplished in an interval of time less than that required for a measured severed length of stock to pass a fixed point. It is, therefore, essential that the acceleration of the assembly from either of its limiting positions must be very rapid and this is further emphasized by the fact that the assembly must move in synchronism with the movement of the stock for a considerable portion of the outward travel of the assembly to allow a sufficient interval of time for the operation of the severing means. Regardless of whether a shearing die set or a rotating saw is used to cut the stock, the speed of travel of the cutting implement must be substantially equal to that of the stock during the inward cutting movement of the implement and the return of the same to its original position.

If stock of relatively heavy section is to be severed by a machine of the kind mentioned, it is possible to apply the motive power for the acceleration and movement of the cutting assembly through the stock itself but, if the stock is of insufficient strength for this purpose, it is necessary to employ additional driving means to accelerate and move the cutting assembly. A primary object of the present invention is the provision of an improved and economical arrangement for oscillating the carriage supporting the cutting implement in synchronism with the speed of travel of the stock. This feature of the invention consists essentially in the employment of resilient towing means which is operative to rapidly accelerate the cutting implement carriage and move the carriage along with the stock for a portion of its outward travel in a smooth and efficient manner, whereby the shock and vibration heretofore normally associated with the operation of machines of the kind involved is obviated.

Another object of the invention is the provision of an improved arrangement on the carriage aforesaid for moving the cutting implement into engagement with the stock, whereby the design and operation of the machine in general is simplified and the resistance to movement of the carriage is kept to a minimum.

A further object of the invention is the provision of an improved and simplified control system for controlling sequentially the operation of the various essential elements of the machine.

The above and other objects and advantages of the invention will become apparent from a consideration of the following detailed description and accompanying drawings, wherein there is specifically disclosed a preferred embodiment of the invention. The embodiment selected utilizes a transversely movable motor driven disk saw to sever the stock but it should be understood that the invention is equally applicable in machines using other severing implements.

In the drawings:

Figure 1 is a side view, partly in section, of a flying cut-off constructed in accordance with the principles of the invention;

Figure 2 is a plan view of the machine of Figure 1;

Figure 3 is an end view, partly in section, of the machine of Figure 1;

Figure 4 is an enlarged detail view taken along the line 4—4 of Figure 2; and

Figure 5 is a schematic view of the controlling system for the machine of Figure 1.

In the drawings, reference numeral 10 designates generally a housing having along its upper wall a pair of spaced parallel rails 11 for the movable support of a saw carriage 12. Carriage 12 is provided with a pair of spaced parallel axles 13 extending transversely above the rails 11 on the ends of which are rotatably mounted the wheels 14 and 15 which are adapted to roll along the rails 11—the wheels 15 being flanged to guide the movement of the carriage. An auxiliary carriage 16 is mounted for transverse movement on the main carriage 12 and for this purpose carriage 16 is provided with four shafts 17, two positioned below the shafts 13 and two thereabove. Rollers 18, carried by one end of the shafts 17, engage above and below one of the shafts 13 and grooved rollers 19, carried by the other ends of the shafts 17, engage above and below the other of the shafts 13 to guide the transverse movement of the carriage 16. The auxiliary carriage 16 carries a motor 20 rotatably driving a circular metal cutting saw 21.

Depending from the main carriage 12 intermediate the rails 11 is a frame 22 provided with forwardly and rearwardly extending openings 23 and a lower wall 24 provided with an aperture 25. Secured to the wall 24 is a cylinder 26 having a piston 27 therein with a connecting rod 28 extending upwardly through the aperture 25. A friction plate 30 is confined within a recess in the upper portion of the frame 22 and a second friction plate 31, having a series of parallel grooves in its upper wall, is positioned in the lower portion of frame 22 and adapted to be moved upwardly and downwardly by the cylinder 26.

A pair of opposed multiple grooved pulleys 33 are rotatably mounted in the base 10 on shafts 34 and 35, respectively, and a series of closed V belts 36 are looped over the pulleys 33, being positioned in the grooves of the pulleys. Shaft 34, having one of the pulleys 33 keyed thereto, is driven through a worm drive 37 and a variable speed transmission 38 by a motor 39. Shaft 35 rotatably supporting the other of the pulleys 33 is carried by a yoke 40 slidably mounted for longitudinal movement in suitable guides provided in the base 10. Yoke 40 is adapted to be moved away from shaft 34 by a bolt 41 attached to the yoke and extending outwardly of an end of the base 10. Nuts 42 are screw-threaded on the end of bolt 41 and engage an end plate 43 to provide means to finally adjust the tension of the belts 36. Belts 36 are of the conventional rubberized fabric type, being substantially V-shaped in cross-section in accordance with usual practice. As such, the belts are resilient to a certain extent, possess great strength and are capable of exerting large forces when tensioned about the grooved pulleys.

Secured to and extending outwardly parallel with the path of travel of the stock through the machine is the stock supporting and gauging bar 45 which may conveniently consist of a tube and which is rotatably supported in trunnions 46 carried by the carriage 12. Collars 47 are secured to the tube 45 immediately inward of the spaced trunnions 46 to prevent endwise movement of the tube 45 relative to the carriage 12. The outer end of the tube 45, which tube is of considerable length, is slidably mounted between a pair of grooved rollers 48 supported on a standard 49. Spaced along bar 45 are a plurality of stock supporting brackets 50 to support the lengths of stock as they are being cut off by the saw 21. Also positioned on the bar 45 is a collar 51 movable along the bar 45 and carrying a stock engaging trip lever 52 which, through shaft 53 carried by the collar 51 and an arm 54, operates a trip rod 55 extending outwardly along the bar 45 and substantially parallel therewith. A suitable connection, not shown, is provided between the arm 54 and the trip rod 55 to enable the arm to be attached along the rod 55 at a selected position determined by the selected position of the collar 51.

Carriage 16, carrying motor 20 and saw 21, is moved back and forth on the carriage 12 into and out of the path of travel of the stock, indicated at 57, by fluid pressure operated cylinder 58 which is carried by the carriage 12 and has the outer free end of its piston rod connected with the carriage 16 at 59. Fluid pressure for the operation of cylinders 26 and 58 is conveyed to the carriage 12 through a flexible conduit 60 connecting at its carriage end with a distributing housing 61 and at its other end with a coupling 62 mounted in fixed position on the base 10, see Figs. 2 and 5. Fluid under pressure is supplied to the coupling 62 through a conduit 63 leading from a pump 64 which is driven by the motor 39. At one side of the base 10 is a casing 65 constituting a fluid reservoir and a support for the pump 64, motor 39 and transmissions 37—38. Hydraulic fluid is drawn from the reservoir through a conduit 66 by the pump 64. The hydraulic fluid is returned from the cylinders 26 and 58 to the reservoir in casing 65 through a flexible conduit 67 extending from a collector 68 on carriage 12 to a coupling 69 on the base 10 and through a conduit 70 connecting coupling 69 with the reservoir.

Referring now to Figure 5, which diagrammatically illustrates the control for the cylinders 26 and 58, a pilot valve 72, having a conduit 73 connected with the collector 68, a conduit 74 connected with the distributer 61 and a conduit 75 connected with a fluid pressure operated valve 76, is mounted on the carriage 12 and adapted to be operated by the trip rod 55 which in turn is actuated by the position of the stock passing through the machine through the trip or flag lever 52. Valve 76 is actuated in one direction by fluid pressure coming through conduit 75 and in the opposite direction by fluid pressure in a conduit 77 connected with a second pilot valve 78, also mounted on carriage 12. A conduit 79 connects valve 78 with distributer 61 and a conduit 80 connects the valve with collector 68. Valve 78 is operated by an arm 81 having a roller at its outer end for engagement with a hinged latch trip 82. The latter is provided with a beveled outer surface and a right-angled end surface and is hinged opposite said end surface for retractive movement as the roller on the end of arm 81 moves along the beveled outer surface during inward movement of the carriage 16. A spring 83 biases the latch 82 to outward position, illustrated in Figure 5.

Valve 76 controls the flow of fluid to and from the cylinder 26 and for this purpose a conduit 84 interconnects distributer 61 and the valve and the conduit 85 leads from the valve to collector 68. Conduits 86 and 87 connect the upper and lower ends, respectively, of the cylinder 26 with the valve 76. Fluid pressure is controllably supplied to the cylinder 58 by means of a mechanical and pressure actuated valve 88 connected with distributer 61 by a conduit 89 and with collector 68 by a conduit 90. Conduits 91 and 92 connect the rear and forward ends, respectively, of the cylinder 58 with the valve 88. Valve 88 is provided with an operating stem 94 having a pivotally mounted outer end 95 carrying a roller 96 for engagement with an inclined surface 97 of a block 98 adjustably mounted on the base 10. A spring 99 maintains member 95 in the relative position shown in Figure 5 and the operation of the assembly is such that as the valve 88 is moved to the left relative to the block 98, as viewed in Figure 5, the valve stem 94 will be depressed to admit fluid pressure through conduit 91 to the rear end of cylinder 58. However, as the valve 88 on the return stroke of the carriage 12 moves past block 98 to the right, as viewed in Figure 5, member 95 will rotate in a counterclockwise direction and the valve stem 94 will not be moved. Valve 88 is inherently provided with a pressure responsive reversing mechanism which operates in such manner that, as the piston in cylinder 58 reaches the end of its stroke, the resulting high pressure built up in conduit 91 will automatically reverse the valve moving the stem 94 to its original outward position.

The operation of the apparatus and the control system described immediately above is as follows: As the stock is advanced through the machine a predetermined distance by the forming mill or other apparatus with which the cutoff may be associated its end engages the lever 52 which actuates the trip rod 55 and pilot valve 72 thereby admitting fluid pressure through conduit 87 to the lower end of cylinder 26. This moves the piston in cylinder 26 upwardly and moves the grooved block 31 (Figs. 1, 3) into tight engagement with the belts 36 thus securely clamping the carriage 12 to the belts. Carriage 12 will accordingly be accelerated and moved along with the belts whose speed of travel may be synchronized with the speed of movement of the stock by adjusting the variable speed transmission 38. As carriage 12 reaches a predetermined position along its path of travel, roller 96 will engage the cam surface 97 and move valve stem 94 inwardly thereby admitting fluid under pressure to the cylinder 58 through conduit 91. Carriage 16 will accordingly be moved laterally and the rapidly revolving saw 21 will be moved into cutting engagement with the stock. An adjustable stop, not shown, is provided to limit the movement of the carriage 16 relative to the carriage 12—it being necessary to move the carriage 16 only a distance sufficient to enable the saw to cut through the stock.

As the piston in cylinder 58 reaches the end of its adjusted stroke abnormal fluid pressure will build up in conduit 91 and reverse the valve 88 thereby admitting fluid pressure to the opposite end of cylinder 58 and moving the carriage 16 back to its original position. It should be understood that the conduits 91 and 92 alternately serve as supply and return conduits in accordance with usual practice. The pressures and volumes of the fluid pressure system for moving the carriage 16 are so selected in design that the inward and outward movement of the carriage takes place in a short interval of time and considerably before the end of the outward stroke of carriage 12 is reached.

During inward movement of carriage 16 latch 82 overrides arm 81 of pilot valve 78 as explained above but during the return movement of this carriage the flat end of the latch 82 will momentarily engage the roller at the end of the arm and rotate the arm to allow an impulse of fluid to flow through conduit 77 and into the fluid pressure operated valve 76. This results in reversal of the valve 76 and the admission of fluid pressure into conduit 86 to move the piston in cylinder 26 and the clamping block 31 back to their original positions. The carriage 12 is now unclamped from the belts and is returned to its original starting position by the spring means to be described below. Conduits 86 and 87 alternatively serve as supply and return conduits in accordance with usual practice.

Referring now to Figure 1, the means employed to move the carriage 12 along its return stroke consists of a cable 100 secured at 101 to the leading end of the carriage, draped over a pulley 102 fixed on base 10 beneath the opposite end of the carriage when the latter is in initial starting position, draped over a spring biased pulley 103, and having its other end secured at 104 to the base 10. Pulley 103 is journaled in a block 105 slidably mounted in guides 106 in the base 10. One or more rods 107 are secured within the base 10 parallel with the guides 106 and pass through an aperture or apertures in the sliding block 105. A coil spring 108 encircles each of the rods 107 between the block 105 and the rear end of the base 10. The operation of the carriage return mechanism is such that as the carriage is moved forwardly by the belts 36 the end of the cable 100, attached to the carriage, will also be moved outwardly resulting in a shortening of the cable between the pulley 102 and the connection 104, thereby moving pulley 103 and 104 to the right, as viewed in Figure 1, against the tension of the spring or springs 108. It should be observed, however, that due to the pulley arrangement used the block 105 will move but half the distance moved by the carriage 12, thus the springs 108 need only be compressed through their most effective range. As the clamp 31 is released the compressed springs 108 will move the block 105 to the left, as viewed in Figure 1, thus drawing the carriage end of the cable and consequently the carriage to the right back to its initial starting position. A dash pot 109 may be provided to cushion the shock of the carriage 12 as it reaches such position.

In the operation of machines of the kind described above it is desirable to provide means to directly clamp the moving stock to the traveling carriage especially during the time the cutting implement is being moved into and out of engagement with the stock and, in accordance with the present invention, it is proposed to accomplish this as a result of the inward movement of the immediate implement carriage, such as the carriage 16. Referring more particularly to Figure 3 of the drawings, a member 110, having a recess of transverse outline substantially similar to the outline of the stock being cut, is interchangeably mounted on the carriage 12 adjacent the plane of movement of the cutting implement 21.

Cooperating with the member 110 is a resilient clamp 111, preferably of rubber, carried by a lever 112 and adapted to be moved into tight engagement with the stock positioned in the recess of member 110. Lever 112 is arranged to be actuated by a link 113 pivotally connected at its lower end with a lever 114 pivotally mounted at one end at 115 to the carriage base. The opposite end of lever 114 is provided with a roller 116 for engagement by an inclined surface 117 on the carriage 16 as the carriage is moved inwardly. It should be obvious from an inspection of Figure 3 that as the carriage 16 is moved inwardly levers 112 and 114 will be moved downwardly and the block 111 moved into engagement with the stock in the recess in block 110.

To provide means to rotate the bar 45 to cause the severed lengths of stock to roll off the supports 50 immediately upon the completion of the severing operation so as not to impede the progress of the subsequently advancing stock, one of the supports 50 which is opposite substantially the center of the auxiliary carriage 16 is provided with an operating latch 119 adapted to be engaged by a clevis 120 on the carriage 16, see Figure 4. The latch 119 is pivotally mounted on the ring 121 carrying the support 50 by the pivot pin 122. Latch 119 is free to rotate in a clockwise direction, as viewed in Figure 4, against the resistance offered by the spring 123 but it cannot rotate in a counter-clockwise direction. During inward movement of the carriage 16 the stock 124 of the clevis 120 simply overrides the rotating latch 119, allowing the lower end of the latch to drop into the open space within the clevis. However, as the carriage 16 and its attached strut 124 commences its outward movement upon completion of the severing operation, the strut 124 will engage the left face of the latch 119, thereby rotating the bar 45 in a counter-clockwise direction, as viewed in Figure 4, which rotation will cause the severed length of stock lying on the supports 50 to slide off the supports. Suitable biasing means, not shown, is employed to rotate the bar 45 in a clockwise direction back to its original operative position, as shown in full lines in Figure 4, upon the disengagement of the strut 124 from the latch 119.

It should now be apparent that I have provided an improved apparatus capable of accomplishing the objects initially set out. By the use of a relatively simple and inexpensive belt system for moving the carriage certain deficiencies inherent in the prior devices are obviated. The apparatus operates with less shock and vibration and since the clamping of the carriage to the belts takes place immediately upon actuation of the cylinder 26, a more accurate control of the lengths of the severed pieces can be effected. Since the power means required to move the auxiliary carriage 16 on the main carriage 12, to actuate the stock clamp 110—111 and the bar rotating mechanism 119—120 is supplied entirely by the cylinder 58 carried bodily by the carriage 12 the resistance to movement of the main carriage 12 is reduced to a minimum. The control of the various constituent instrumentalities is simplified and accomplished by the use of rugged devices capable of long and continuous service.

The above specifically described embodiment of the invention should be considered as illustrative only as obviously many changes may be made therein without departing from the spirit or scope of the invention. For example, it should be apparent that the pulleys 33 may well be driven from the motor which drives the forming mill or other apparatus with which the cut-off is associated or other synchronizing means employed whereby the rate of travel of the saw carriage 12 may be made to coincide with the rate of delivery of the stock from the mill or other apparatus.

What I claim is:

1. In apparatus for severing uniform lengths from continuously moving stock the combination of a base, a carriage reciprocably mounted on said base, stock severing means on said carriage, a pair of grooved pulleys mounted on spaced parallel axes in said base, means to rotate one of said pulleys, a V belt entrained over said pulleys and having a reach extending substantially parallel with the direction of travel of said carriage, and means comprising a fluid pressure operated grooved clamp to clamp said carriage to said belt.

2. In apparatus for severing uniform lengths from continuously moving stock the combination of a base, a carriage reciprocably mounted on said base, stock severing means on said carriage, means comprising a continuously moving resilient belt to move said carriage along with said moving stock, and means to move said carriage in a direction opposite to the direction of movement of said stock comprising a fixed pulley, a slidably mounted pulley and a cable fixed to said carriage and entrained over said fixed pulley and said slidable pulley and connected at its other end with said base, means biasing said sliding pulley in one direction, said cable lying in a sinuous path whereby said biasing means tensions said cable.

3. In apparatus for severing uniform lengths from continuously moving stock the combination of a base, a carriage reciprocably mounted on said base, a rotating saw on said carriage and movable into and out of the path of travel of the stock, a motor for moving said saw relative to said carriage, a stock clamp carried by said carriage, a rotatable stock support carried by said carriage, means to move said carriage along with said stock and means connected with said motor to operate said clamp and rotate said support.

4. In apparatus of the character described the combination of a base, a carriage reciprocably mounted on said base, means to move said carriage along with continuously moving stock comprising a continuously moving V belt, means to clamp said carriage to said V belt, stock severing means on said carriage movable into and out of the path of travel of said stock and means responsive to the outward movement of said stock severing means to disengage said clamping means.

5. Apparatus for severing traveling stock comprising a base, a reciprocable carriage mounted thereon, stock severing means on said carriage and movable thereon into and out of the path of travel of the stock through said apparatus, a belt carried by said base and movable in a path substantially parallel with the path of movement of said carriage, means to move said belt along said path comprising a motor, fluid pressure means to clamp said carriage to said belt, fluid pressure means to move said stock severing means on said carriage, a fluid pressure pump driven by said motor, and a flexible conduit connecting the outlet of said pump with said fluid pressure means.

6. In apparatus for severing uniform lengths from continuously moving stock the combination of a base, a carriage reciprocably mounted on said base, stock severing means on said carriage, means comprising a continuously moving resilient belt to move said carriage along with said moving stock, and means to move said carriage in a direction opposite to the direction of movement of said stock comprising a fixed pulley, a slidably mounted pulley and a cable fixed to said carriage and entrained over said fixed pulley and said slidable pulley and connected at its other end with said base, means biasing said sliding pulley in one direction, said cable lying in a sinuous path whereby said biasing means tensions said cable.

7. In a cut-off mechanism for continuously advancing stock the combination of a base, a carriage reciprocably mounted on said base, stock severing means on said carriage, means to move said carriage along with said stock comprising a continuously moving V belt having a reach extending generally parallel with the path of travel of said carriage and stock, a clutch on said carriage to engage said belt whereby said carriage will be caused to move along with said belt, a fluid pressure motor in control of said clutch, means to move said stock severing means into and out of the path of travel of said stock comprising a second fluid pressure motor, and means to supply fluid under pressure to said motors.

8. Apparatus for severing traveling stock comprising a base, a carriage reciprocably mounted thereon stock severing means on said carriage and movable thereon into and out of the path of travel of the stock, a V belt carried by said base and movable in a path substantially parallel with the path of movement of said carriage, and means to clamp said carriage to said belt comprising an open frame secured to said carriage and through which said belt is adapted to extend, a fixed flat friction surface in said frame adapted to engage the outer flat surface of said belt, a second friction member having a grooved surface to engage the inner and side surfaces of said belt slidably mounted in said frame for movement toward and away from said first mentioned friction surface, and power means to move said second mentioned friction member.

9. Apparatus of the character disclosed comprising in combination, a base, a shaft rotatably mounted in said base, a second shaft rotatably mounted in said base and adapted to be moved toward and away from said first mentioned shaft, a V grooved pulley on each of said shafts, an endless V belt entrained over said pulleys, a carriage for stock severing means slidably mounted on said base for movement along a path generally parallel with a reach of said belt, a V grooved clamp on said carriage for securing said carriage to said belt, means to rotate said first mentioned shaft comprising a motor and a variable speed transmission, said clamp being fluid pressure operated, and a fluid pump driven by said motor and supplying fluid pressure to said clamping means.

10. Apparatus of the character disclosed comprising in combination, a base, spaced V grooved pulleys rotatably mounted in said base, resilient V belts entrained over said pulleys, a carriage for stock severing means slidably mounted on said base, a fluid pressure operated clamp mounted on said carriage and adapted to secure a reach of said belts to said carriage, fluid pressure means on said carriage to move said severing means into engagement with the stock to be severed, flexible means to conduct fluid under pressure to said carriage, controlled means to interconnect said flexible means with said clamping means, means responsive to movement of said carriage by said belts to interconnect said flexible means with said stock severing moving means, means to reverse the operation of said last mentioned means, and means responsive to said severing means attaining a predetermined retracted position to release said clamping means.

DWIGHT A. JOHNSTON.